May 29, 1923.  1,456,730
D. F. GEIGER
TRACTOR
Original Filed Oct. 26, 1916  3 Sheets-Sheet 1

May 29, 1923.

D. F. GEIGER

TRACTOR

Original Filed Oct. 26, 1916    3 Sheets-Sheet 2

1,456,730

May 29, 1923.

D. F. GEIGER

TRACTOR

Original Filed Oct. 26, 1916   3 Sheets-Sheet 3

1,456,730

Inventor:
David F. Geiger.
by: B. Bradbury
Attorney.

Patented May 29, 1923.

1,456,730

UNITED STATES PATENT OFFICE.

DAVID F. GEIGER, OF MINNEAPOLIS, MINNESOTA, ASSIGNOR OF ONE-THIRD TO ARTHUR D. COLE, OF MINNEAPOLIS, MINNESOTA.

TRACTOR.

Application filed October 26, 1916, Serial No. 127,814. Renewed March 26, 1921. Serial No. 455,986.

*To all whom it may concern:*

Be it known that I, DAVID F. GEIGER, a citizen of the United States, residing at Minneapolis, in the county of Hennepin and State of Minnesota, have invented a new and useful Improvement in Tractors, of which the following is a specification.

This invention relates to improvements in tractors, the primary object being to produce a power driven vehicle which will utilize a maximum amount of power produced by the prime mover for pulling a vehicle or implement over the ground. With my improvement great initial power is available at all times for overcoming large obstructions, and the application of driving force and the distribution of the weight of the parts places the center of gravity low down, making the vehicle difficult to tip over and powerful in pulling capacity. The mechanism interposed between the driving wheels and the prime mover is also extremely simple and effective in operation, the amount of friction necessary being reduced to a minimum, and the flexibility of operation great. The arrangement of the parts makes the tractor effective on soft ground, as well as upon hard and smoothly finished roads and the construction being exceedingly simple and inexpensive fills a long felt want in the nature of a farming implement.

Figure 1:
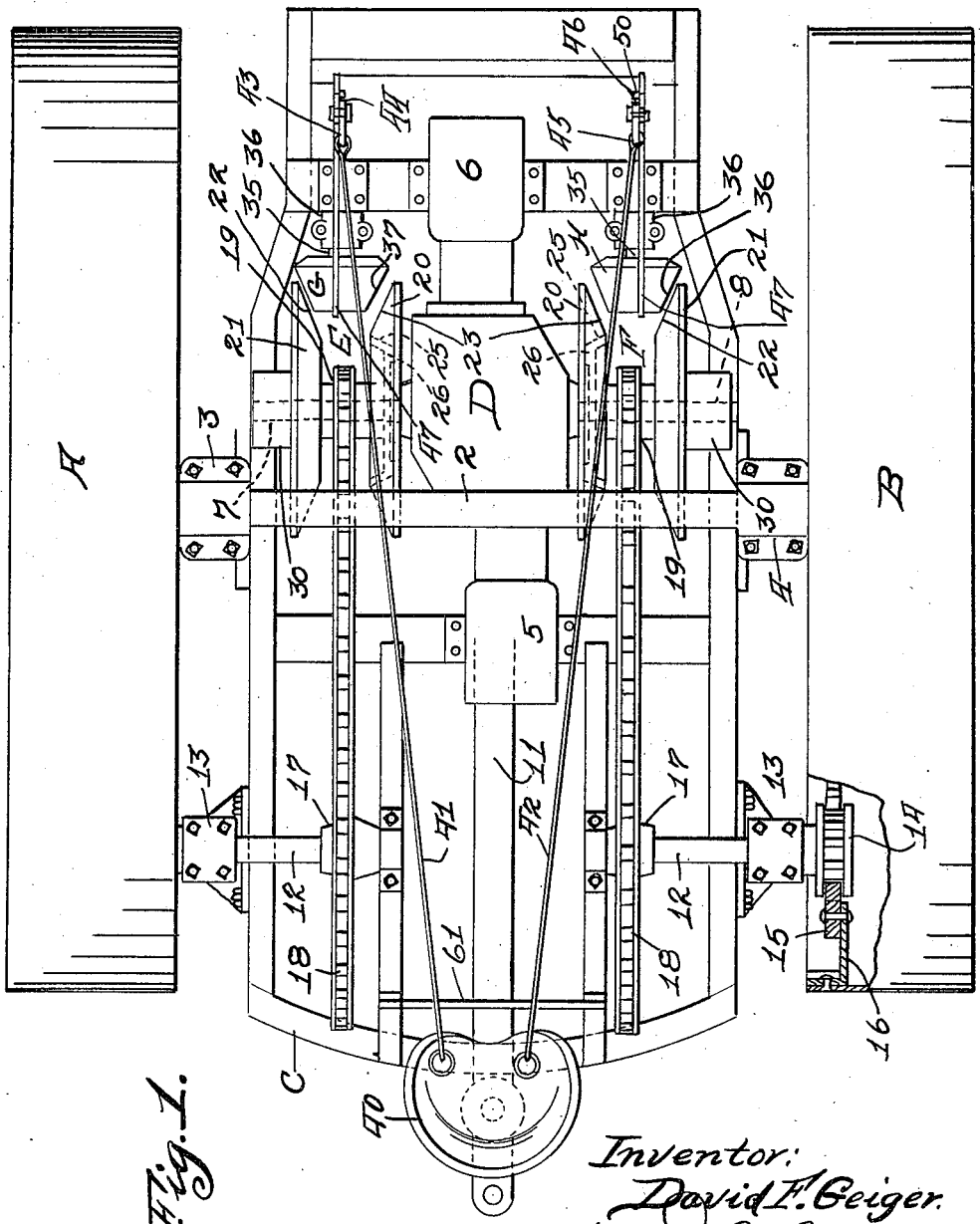
Figure 2:
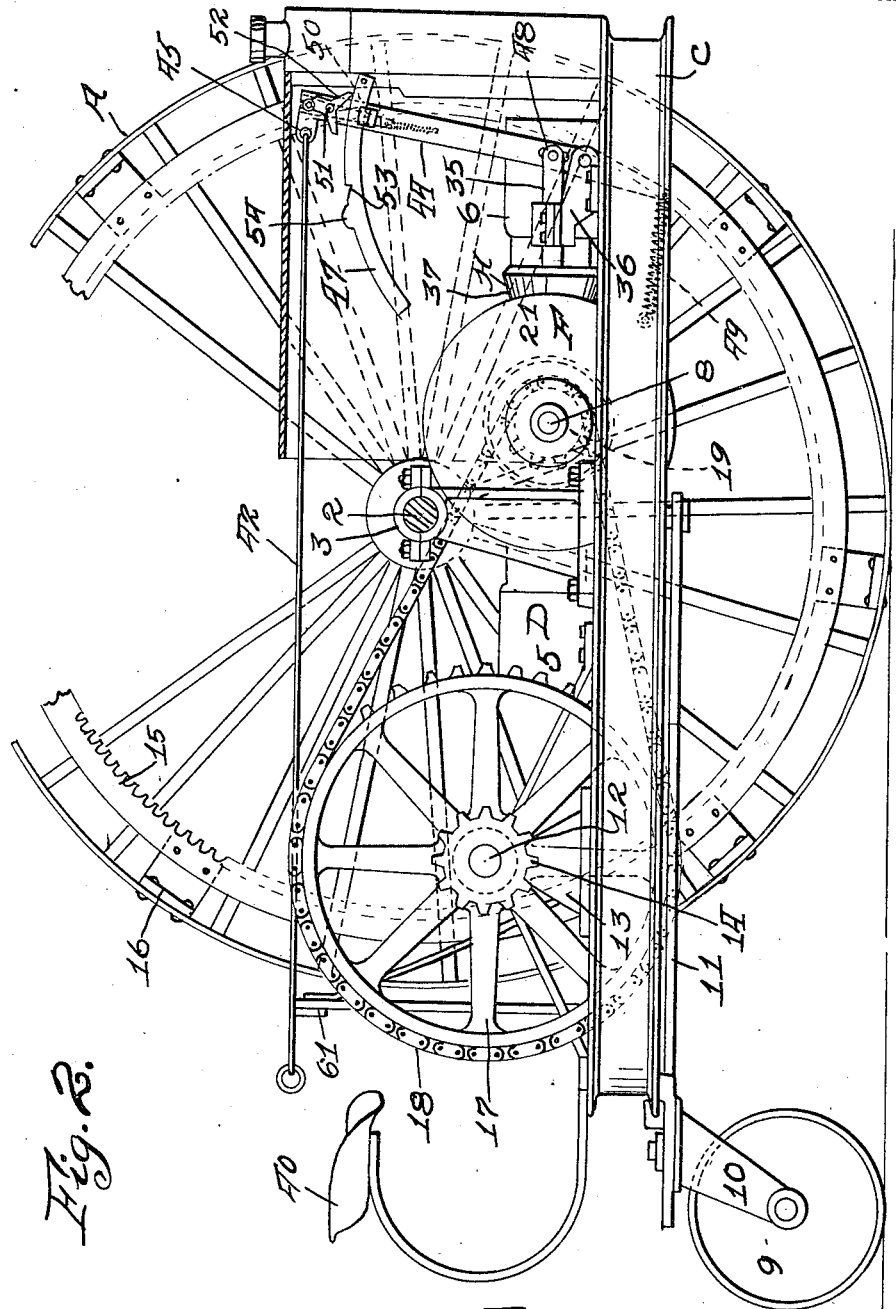
Figure 3:
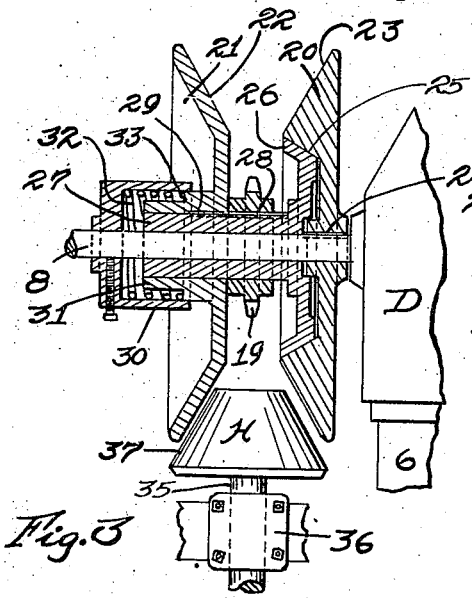
Figure 4:
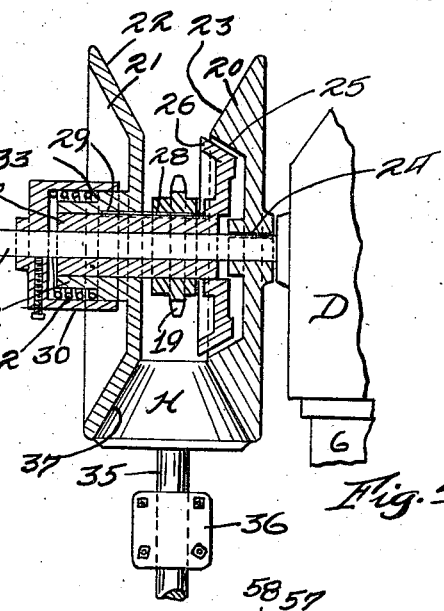
Figure 5:
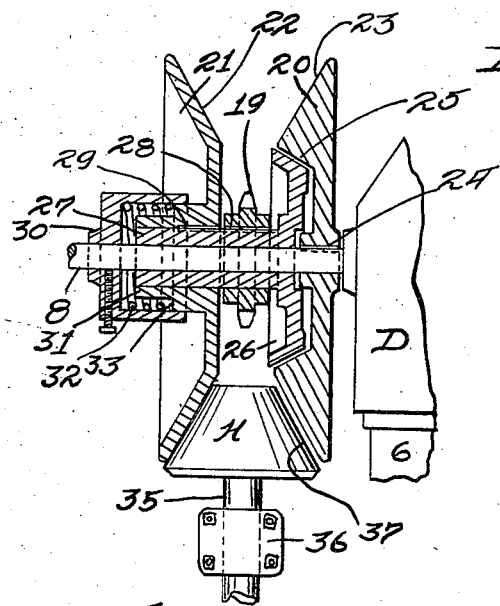
Figure 6:
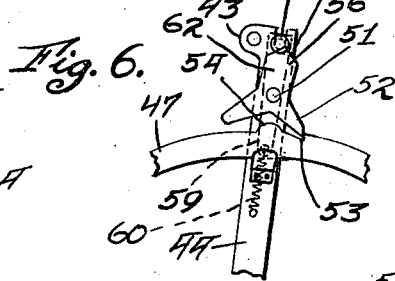
Figures 7, 8:
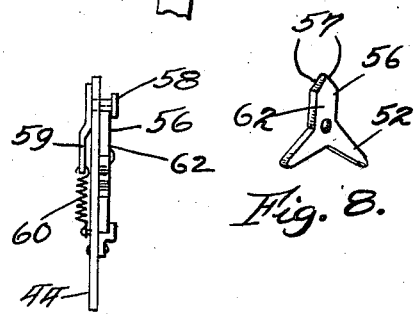

In the accompanying drawings forming part of this specification, Fig. 1 is a plan of my invention; Fig. 2 is a side elevation when one of the traction wheels is removed; Fig. 3 is a part sectional view of the clutches showing the transmission friction pinion in disconnected position; Fig. 4 is another part sectional view of the parts shown in Fig. 3, the transmission friction pinion being shown in engaged position; Fig. 5 is another part sectional view of the parts shown in Figs. 3 and 4, the transmission friction pinion being shown in still another engaged position; Fig. 6 is a side elevation of a detail showing a portion of one of the operating levers for shifting the friction pinions; Fig. 7 is an edge view of the structure shown in Fig. 6, and Fig. 8 is a perspective of the dog shown in Fig. 6.

In the drawings, let A and B represent a pair of main traction wheels of comparatively large diameter having broad faced peripheries and co-axially arranged in spaced relation. These two wheels are journaled upon a stationary axle or shaft 2. Hung from said shaft by bearing members 3 and 4 is a main carrier frame C of channel iron construction braced and cross-braced in any suitable manner to rigidly support the power element D, which as illustrated is in the form of an internal combustion engine having single opposed cylinders 5 and 6 and a crank shaft formed with laterally extending ends 7 and 8, but may be of any construction or type desired. The rearward portion of the frame is supported by an idle caster wheel 9, which is swiveled by the yoke member 10 depending from the rear end of the frame C and the draw bar 11 is pivotally secured centrally between the main tractor wheels to the lower portion of the main frame C and extends rearwardly, the line of draft in pulling a load being low down in the most effective position.

The idler need not be employed when the frame is secured to a load in a manner to support the rearward portion thereof.

Power is applied to each of the main tractor wheels by a counter shaft 12 journaled in bearings 13 on the frame, a driven pinion 14 on said counter shaft and an internal rack gear 15 with the teeth of which the teeth of said pinion mesh, said rack gear being secured to the inner surface of the wheel by supports 16. This mechanism just described is duplicated on both sides of the machine, one set of mechanism being adapted to transmit power and drive the wheel A, while the other acts in a similar nature in driving the wheel B. Each of the counter shafts 12 carries a main sprocket wheel 17, which is driven by a chain belt 18, said chain belt in turn being driven by a sprocket pinion 19. This portion of the mechanism is also in duplicate, one set being operatively connected with the projecting portion 7 of the crank shaft of the engine, while the other is operatively connected with the projecting portion 8 of the crank shaft.

Disposed on both of the projecting portions 7 and 8 of the crank shaft and adapted to be revolved thereby are two sets of power transmitters E and F, said sets being similar in construction. A description of one is therefore applicable to either, it being understood that one controls the operation of one of the traction wheels, while the other controls the operation of the other traction wheel. Referring particularly to the power transmitter E, 20 and 21 are a pair of friction gears acting as balance wheels having a pair of corresponding adjacent conical faces 22 and 23. The friction gear 20 is rigidly secured to the portion 8 of the crank shaft by the key 24 and is provided with an internal conical clutch surface 25, with which the clutch member 26 is adapted to move into and out of frictional engagement to transmit motion from the crank shaft to the clutch member. The clutch member is formed with an outwardly extending sleeve 27, which is mounted upon and free to turn on the extending member 8 of the crank shaft. The pinion 19 which is adapted to assist in conveying motion to the traction wheel A is slidably secured on the sleeve 27 by a feather 28. The friction gear 21 is rigidly secured to the sleeve 27 by the key 29, the pinion 19 being interposed between the adjacent portions of said friction gears. A cup member 30 is secured on the outer end of the projecting portion 8 of the crank shaft over the hub portion 31 of the friction gear 21 and contains a helical expansion spring 32, which being seated in said cup and pressing against a shoulder 33 on the hub 31 tends to slide the sleeve and the clutch member 26 inwardly on the shaft with the friction surface of the clutch member 26 into engagement with the conical surface 25 in the friction gear 20. Thus motion is transmitted by the clutch 26 from the friction gear 20 and crank shaft to the friction gear 21, unless the friction gear 21 is forced outwardly on the shaft with the clutch member 26 disengaged from the friction gear 20.

The operation of the power transmitters is controlled by the friction pinions G and H, the pinion G directly co-operating with the power transmitter E and the pinion H co-operating with the power transmitter F. These friction pinions are similar in construction and operation and a description of one will therefore suffice. Referring to the pinion G, said pinion is mounted upon a longitudinally disposed shaft 35, which is slidably journaled in the bearing frame 36, which in turn is mounted on the main frame of the structure. This friction pinion has a conical surface 37, which is arranged in outward position of the shaft 35 in contact wth the conical friction surface 22 of the friction gear 21. When said shaft is moved inwardly toward the axis of the crank shaft the friction gear 21 is engaged by the pinion 37 and the clutch disengaged from the friction gear 20 against the pressure. This movement disconnects the crank shaft of the engine D from revolving or driving the traction wheel A, it being understood that normally when the shaft 35 is in outward position and the friction surface of the friction pinion G out of contact with the friction surface 22 of the friction gear 21 power is transmitted from the crank shaft to the traction wheel A, and said wheel revolved in a forward direction. Continued sliding movement of the shaft 35 inwardly forces the friction pinion with its friction surface 37 into contact with both of the friction surfaces 22 and 23 on the friction gears 20 and 21. In this condition as illustrated in Fig. 4, the clutch member 26 is disengaged from the friction gear 20 and motion is transmitted from the friction gear 20 to the friction gear 21 and thence to the pinion 19 in a reverse direction, causing the traction wheel A to revolve backwardly.

The sliding movement of the shaft 35 is controlled by hand by the driver who may rest upon the seat 40 near the rearward portion of the machine by a pair of rods 41 and 42, or other driving devices, the rod 41 being pivotally connected to an eye 43 on the controlling lever 44, while the rod 42 is connected to an eye 45 on the controlling lever 46, there being an operating rod, and controlling lever for manipulating each of the friction pinions G and H. Each of the controlling levers slides over a quadrant 47 (see Fig. 2), and is pivoted near its lower end on one of the bearings 36 which is mounted on the main frame. The end of the shaft 35 which slides in the bearing 36 and carries one of the friction pinions is hingedly connected with the operating lever 44 by a pivot and slot connection 48. The lower depending portion of the operating lever 44 is attached to a spring 49 which is anchored on the main frame of a machine and tends to draw the lever 44 and the operating rod which it carries into going ahead position of the vehicle as illustrated in Fig. 2. In this position, the operating lever rests against a stop 50 on the quadrant and the parts of the corresponding power transmitter assume the position illustrated in Fig. 3. When the operating lever 44 is tilted back into median position and the parts of the power transmitter assume the position illustrated in Fig. 5, the dog 62 which is pivotally mounted by the pin 51 on the upper end of said lever engages by its forward tooth 52 a notch 53 in the quadrant and holds the operating lever against returning into forward position and causes the corresponding friction pinion to disengage the clutch 26 from the friction gear with which it cooperates without transmitting any motion to the corresponding traction wheel. Continued rearward pulling of the corresponding operating rods 41 or 42 tilts the operating lever 44 backwardly until the friction pinion assumes the position illustrated in Fig. 4, whereupon motion is transmitted to the corresponding traction wheel in a reverse direction, so long as the hand operating rod is held in backward position. While the operating lever 44 is moving forward again into median position, the dog 62 sweeps over a shoulder 54 on the quadrant and is tilted forwardly beyond the notch, so that the dog will not re-engage the notch 53 upon the forward return movement of the operating lever. The dog remains in this position until the operating lever is again pulled backwardly from going ahead position. The dog is formed with an upwardly projecting member 56 having a pair of forwardly and rearwardly inclined surfaces 57 over which a pin 58 on a slide 59 engages. This slide is movable longitudinally on the operating lever and is drawn downwardly by a spring 60, which is anchored on said lever. In this manner the pin 58 rides on the upper portion of the dog and either holds the dog tilted forward or backward, at the same time allowing it to be forced by the shoulder 54 into either of said positions.

Assuming the engine to be in operation, the traction wheels can be operated independently and caused to revolve forwardly or backwardly simultaneously by manipulating the operating rods 41 and 42. When making a turn either of the wheels can be made to either stand still or reverse, while the other is revolving forwardly, this action being easily controlled in much the same manner as driving a horse. The mechanism enables a quick and short turn to be made and is responsive to a very slight pull of the operating rods. The rearward portion of the operating rods may be supported by the rest 61, which is mounted transversely on the tractor frame immediately in front of the seat 40.

In accordance with the patent statutes, I have described the principles of operation of my invention, together with the apparatus which I now consider to represent the best embodiment thereof, but I desire to have it understood that the construction shown is only illustrative, and that the invention can be carried out by other means and applied to uses other than those above set forth within the scope of the following claims.

Having described my invention, what I claim as new and desire to protect by Letters Patent is:

1. Apparatus of the class set forth, comprising, in combination, a pair of revoluble tractor elements, a frame freely hung between said tractor elements, a power unit carried by said frame having a drive shaft, independent transmission elements interposed one between each of said tractor elements and said power unit, each of said transmission elements consisting of a pair of friction gears, one being coupled to the power unit and the other coupled to a tractor element and being urged toward and adapted to clutch the companion friction gear, and a friction pinion interposed between said gears and normally urged out of contact with said friction surfaces, said pinion being slidable to frictionally engage said movable gear, disconnect said friction gears and the driving motion between said power unit and a tractor element and upon further thrust movement of said pinion to engage both of the friction surfaces of said friction gears and cause the reverse revolution of a tractor wheel.

2. Apparatus of the class set forth, comprising, in combination, a pair of revoluble tractor elements, a frame freely hung between said tractor elements, a power unit carried by said frame having a drive shaft, independent transmission elements interposed one between each of said tractor elements and said power unit, each of said transmission elements consisting of a pair of friction gears, one being coupled to the power unit and the other coupled to a tractor element and being urged toward and adapted to clutch the companion friction gear, a friction pinion interposed between said gears and normally urged out of contact with said friction surfaces, said pinion being slidable to frictionally engage said movable gear, disconnect said friction gears and the driving motion between said power unit and a tractor element and upon further thrust movement of said pinion to engage both of the friction surfaces of said friction gears and cause the reverse revolution of a tractor wheel, and means for controlling the thrust movement of said pinion.

3. Apparatus of the class set forth, comprising, in combination, a pair of revoluble tractor elements, a frame freely hung between said tractor elements, a power unit carried by said frame having a drive shaft, independent transmission elements interposed one between each of said tractor elements and said power unit, each of said transmission elements consisting of a pair of friction gears, one being coupled to the power unit and the other coupled to a tractor element and being urged toward and adapted to clutch the companion friction gear, a friction pinion interposed between said gears and normally urged out of contact with said friction surfaces, said pinion being slidable to frictionally engage said movable gear, disconnect said friction gears and the driving motion between said power unit and a tractor element and upon further thrust movement of said pinion to engage both of the friction surfaces of said friction gears and cause the reverse revolution of a tractor wheel, a lever for sliding said pinion, said lever being urged into forward position when the pinion is disengaged from said gears, pawl and ratchet mechanism associated with said lever for holding the latter in forward position and means associated with said pawl and ratchet mechanism and lever for automatically releasing the lever by pulling the lever backward and then permitting it to swing forward.

4. Apparatus of the class set forth, comprising, in combination, a pair of coaxially arranged drive wheels having drive gearing, a body frame between and hung from said wheels, a power unit mounted upon said frame, a pair of independent driving units mounted upon said frame and movable into three positions, each of said driving units being arranged to communicate motion from said power unit to one of said wheels, clutch mechanism normally urging the parts of each of said driving units into a position to cause revolution of one of the wheels in one direction, and movable into one position in which the power is released from revolving said wheel and into another position in which the power reverses the direction of revolution of said wheel, a lever for actuating said clutch mechanism into its three positions, a line connected to said lever and means for holding said lever in median position, said last mentioned means being releasable by pulling on said line.

In testimony whereof, I have signed my name to this specification.

DAVID F. GEIGER.